United States Patent
Nilsson et al.

(10) Patent No.: US 10,680,688 B2
(45) Date of Patent: Jun. 9, 2020

(54) BEAM TRAINING OF A RADIO TRANSCEIVER DEVICE

(71) Applicant: Telefonaktiebolaget LM Ericsson (publ), Stockholm (SE)

(72) Inventors: Andreas Nilsson, Göteborg (SE); Fredrik Athley, Kullavik (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 15/752,473

(22) PCT Filed: Jan. 29, 2018

(86) PCT No.: PCT/EP2018/052047
§ 371 (c)(1),
(2) Date: Feb. 13, 2018

(87) PCT Pub. No.: WO2019/145047
PCT Pub. Date: Aug. 1, 2019

(65) Prior Publication Data
US 2019/0238201 A1    Aug. 1, 2019

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0686* (2013.01); *H04B 7/0695* (2013.01);
(Continued)

(58) Field of Classification Search
None
See application file for complete search history.

(56) References Cited

U.S. PATENT DOCUMENTS

2013/0051302 A1    2/2013   Kim
2016/0365900 A1*   12/2016  Kim ................. H04B 7/0408
(Continued)

FOREIGN PATENT DOCUMENTS

WO    WO 2018/017920 A1    1/2018

OTHER PUBLICATIONS

Transmittal of International Search Report and Written Opinion of the International Searching Authority, International Search Report, and Written Opinion of the International Searching Authority, PCT/EP2018/052047, dated Oct. 26, 2018, 13 pages.
(Continued)

*Primary Examiner* — Alex Skripnikov
(74) *Attorney, Agent, or Firm* — Sage Patent Group

(57) ABSTRACT

There is provided mechanisms for beam training. A method is performed by a radio transceiver device. The method comprises receiving, during a transmission beam sweep and using first receive beams of mutually different polarizations, a reference signal. The reference signal has been transmitted by another radio transceiver device during the transmission beam sweep in a set of transmit beams. The reference signal is received in order for the radio transceiver device to determine which transmit beam in the set of transmit beams that has highest received power. The method comprises determining, based on which transmit beam in the set of transmit beams that has highest received power, a set of second receive beams. The set of second receive beams is to be used by the radio transceiver device during a reception beam sweep.

17 Claims, 5 Drawing Sheets

(51) Int. Cl.
*H04B 7/10* (2017.01)
*H04L 5/00* (2006.01)

(52) U.S. Cl.
CPC .............. *H04B 7/088* (2013.01); *H04B 7/10* (2013.01); *H04L 5/0048* (2013.01)

(56) References Cited

U.S. PATENT DOCUMENTS

2018/0139030 A1\* 5/2018 Kim ...................... H04L 5/0042
2019/0349049 A1\* 11/2019 Li ........................ H04B 7/0617

OTHER PUBLICATIONS

3GPP, Technical Report—"3rd Generation Partnership Project; Technical Specification Group Radio Access Network; Study on New Radio Access Technology Physical Layer Aspects (Release 14)", 3GPP TR 38.802 V14.2.0 (Sep. 2017), 144 pp.
Ericsson et al., "Performance of beam management without beam indication", Agenda Item: 7.2.2.6, Document for: Discussion and Decision, 3GPP TSG RAN WG1 Meeting 90bis, R1-1718742, Prague, CZ, Oct. 9-13, 2017, 12 pp.
Examination Report for Indian Application No. 201847005509 dated Mar. 23, 2020, 6 Pages.

\* cited by examiner

BEAM TRAINING OF A RADIO TRANSCEIVER DEVICE

CROSS REFERENCE TO RELATED APPLICATION

This application is a 35 U.S.C. § 371 national stage application of PCT International Application No. PCT/EP2018/052047, filed on Jan. 29, 2018, the disclosure and content of which is incorporated by reference herein in its entirety.

TECHNICAL FIELD

Embodiments presented herein relate to a method, a radio transceiver device, a computer program, and a computer program product for beam training.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS), used for beam management.

The reference signals for beam management can be transmitted periodically, semi-persistently or aperiodic (event triggered) and they can be either shared between multiple terminal devices or be device-specific. In order for the terminal device to find a suitable network node beam, the network node transmits the reference signal in different transmission (TX) beams on which the terminal device performs measurements, such as reference signal received power (RSRP), and reports back the N best TX beams (where N can be configured by the network). It is expected that different TX beams are transmitted in different reference signal resources (where each resource is defined in a time/frequency-grid, and that the terminal device reports back N resource indicators, such as CSI-RS resource indicators (CRIs), to inform the network node which TX beams are best. Furthermore, the transmission of the reference signal on a given TX beam can be repeated to allow the terminal device to evaluate a suitable reception (RX) beam.

There are basically three different implementations of beamforming at the TRP; beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different terminal devices, different implementations will be needed. A panel might be regarded as an antenna array of single- or dual-polarized antenna elements with typically one transmit/receive unit (TXRU) per polarization. An analog distribution network with phase shifters is used to steer the beam of each panel.

One drawback with an analog beamforming implementation is that the TRP only can transmit or receive in one beam at a time (assuming one panel, and the same beam for both polarizations, which typically is the case in order to counteract dropped signal strength due to polarization mismatching).

FIG. 1 at 1), 2), and 3) schematically illustrates how a decoupled TX (at the TRP 400b of a radio transceiver device 200b implemented as a network node) and RX (at the TRP 400a of a radio transceiver device 200a implemented as a terminal device) beam sweep can be performed in order to find a BPL to be used for data transmission. In this respect, decoupled means here that the TX beam and the RX beam are determined independently of each other, as opposed to a joint sweep where every possible combination of TX beam and RX beam is tested. At 1) the network node performs a TX beam sweep by transmitting a burst of CSI-RS resources in different TX beams 140. The terminal device measures the received power for each CSI-RS resource using a wide RX beam 150 and reports which CSI-RS resource that gave the highest received power (as defined by TX beam B1 in the illustrative example). At 2) the network node transmits a burst of CSI-RS resources using the best TX beam so that the terminal device can test different narrow RX beams and find its best RX beam (as defined by RX beam B2 in the illustrative example). At 3) a BPL for data transmission can be established using the selected TX beam B1 and the selected RX beam B2.

Finding the best TX beam and the best RX beams according to the beam training procedure outlined in FIG. 1 is time consuming and causes high signaling overhead, even for a decoupled TX/RX beam sweep.

Hence, there is still a need for an improved beam training procedure.

SUMMARY

An object of embodiments herein is to provide efficient beam training that does not suffer from the issues mentioned above, or at least where these issues are mitigated or reduced.

According to a first aspect there is presented a method for beam training. The method is performed by a radio transceiver device. The method comprises receiving, during a transmission beam sweep and using first receive beams of mutually different polarizations, a reference signal. The reference signal has been transmitted by another radio transceiver device during the transmission beam sweep in a set of transmit beams. The reference signal is received in order for the radio transceiver device to determine which transmit beam in the set of transmit beams that has highest received power. The method comprises determining, based on which transmit beam in the set of transmit beams that has highest received power, a set of second receive beams. The set of second receive beams is to be used by the radio transceiver device during a reception beam sweep.

According to a second aspect there is presented a radio transceiver device for beam training. The radio transceiver device comprises processing circuitry. The processing circuitry is configured to cause the radio transceiver device to receive, during a transmission beam sweep and using first receive beams of mutually different polarizations, a reference signal. The reference signal has been transmitted by another radio transceiver device during the transmission beam sweep in a set of transmit beams. The reference signal is received in order for the radio transceiver device to determine which transmit beam in the set of transmit beams that has highest received power. The processing circuitry is configured to cause the radio transceiver device to determine, based on which transmit beam in the set of transmit beams that has highest received power, a set of second receive beams. The set of second receive beams is to be used by the radio transceiver device during a reception beam sweep.

According to a third aspect there is presented a radio transceiver device for beam training. The radio transceiver device comprises a receive module configured to receive, during a transmission beam sweep and using first receive beams of mutually different polarizations, a reference signal. The reference signal has been transmitted by another radio transceiver device during the transmission beam sweep in a set of transmit beams. The reference signal is received in order for the radio transceiver device to determine which transmit beam in the set of transmit beams that has highest received power. The radio transceiver device comprises a determine module configured to determine, based on which transmit beam in the set of transmit beams that has highest received power, a set of second receive beams. The set of second receive beams is to be used by the radio transceiver device during a reception beam sweep.

Advantageously this provides efficient beam training.

Advantageously the proposed beam training does not suffer from the issues mentioned above.

Advantageously the proposed beam training enables the number of beams in an RX beam sweep to be reduced by a factor of two. This reduces the overhead and beam sweep time, leading to increased performance.

Advantageously, if the number of RX beams is fixed, the proposed beam training enables the RX beam sweep can be performed with finer angular granularity. This leads to reduced straddling loss in the beam measurements and subsequent data communication.

According to a fourth aspect there is presented a computer program for beam training, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
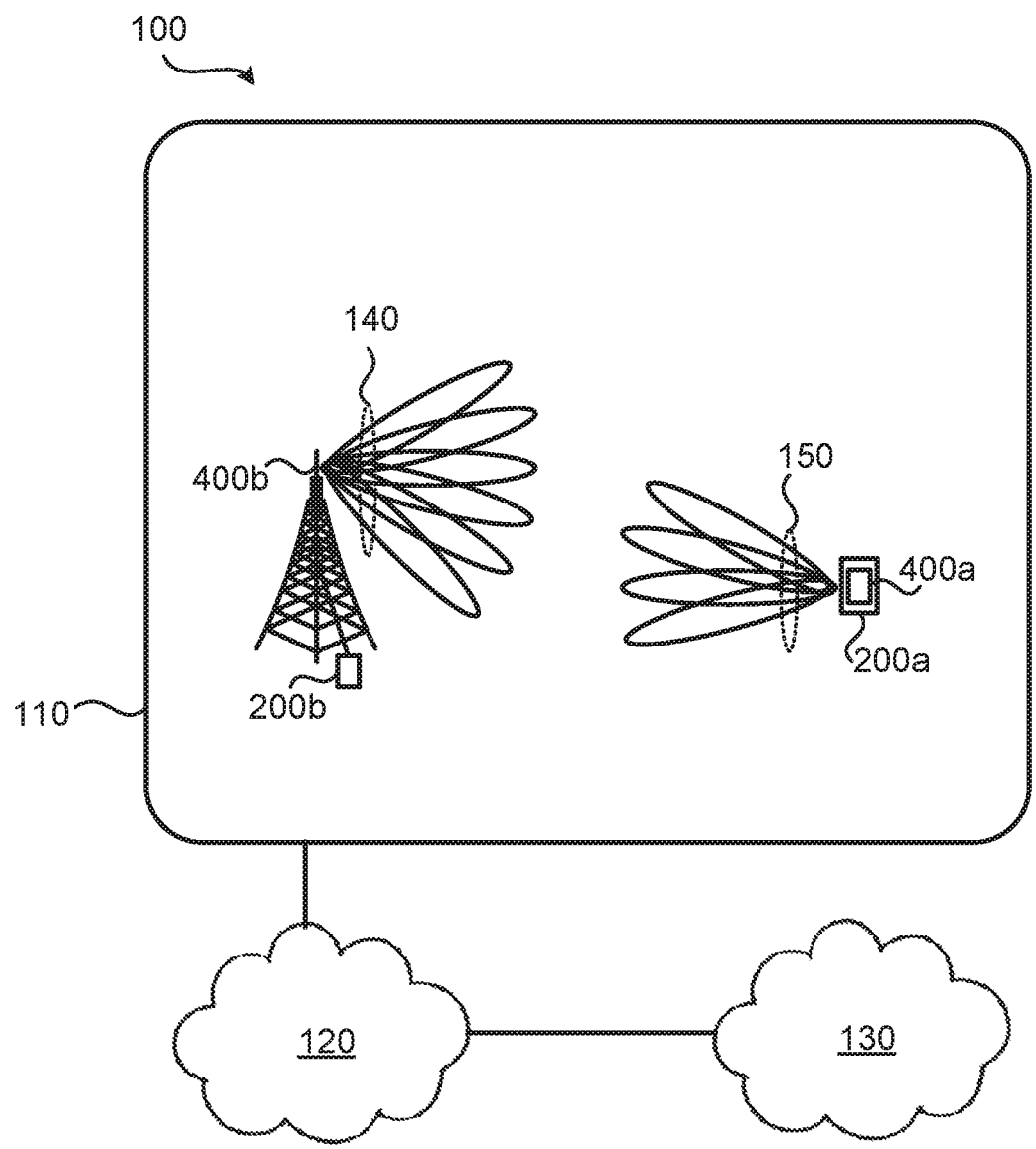
FIG. 2 is a schematic diagram illustrating a communications network according to embodiments.

FIG. 2 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a radio transceiver device 200b configured to, via TRP 400b, provide network access to radio transceiver device 200a, comprising TRP 400a, in a radio access network 110. In some embodiments radio transceiver device 200a is part of, integrated with, or collocated with, a terminal device and radio transceiver device 200a is part of, integrated with, or collocated with, a network node.

Radio access network 110 is operatively connected to a core network 120. The core network 120 is in turn operatively connected to a service network 130, such as the Internet. Radio transceiver device 200a is thereby, via the TRP 400b and radio transceiver device 200a, enabled to access services of, and exchange data with, the service network 130.

Examples of network nodes are radio access network nodes, radio base stations, base transceiver stations, Node Bs, evolved Node Bs, g Node Bs, access points, access nodes, and backhaul nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at a radio transceiver device implemented both as a radio access network node and a terminal device, or even as a radio transceiver device implemented as a backhauling node or a sidelink node. Thus, although radio transceiver device 200b in at least some of the herein disclosed embodiments is described as being a network node and radio transceiver device 200a is described as being a terminal device, the functionality of the herein disclosed radio transceiver device 200b could equally be implemented in a terminal device, and vice versa for radio transceiver device 200a.

Radio transceiver device 200a is, via TRP 400a, configured to communicate with radio transceiver device 200b in beams 150. Further, radio transceiver device 200b is, via TRP 400b, configured to communicate with radio transceiver device 200a in beams 140. Radio transceiver device 200a, 200b could be configured to communicate using a variety of beams having different shapes and widths, herein generally referred to as having different beam patterns.

As disclosed above a beam management procedure might be performed in order to find a BPL for radio transceiver device 200a and radio transceiver device 200b. As further disclosed above, the beam management procedure disclosed above might result in some issues.

In further detail, during a TX beam sweep as performed by the network node, the terminal device should have a wide RX beam as possible so as to maximize its chances of receiving all TX beams during the beam sweep. In the RX beam sweep, the terminal device has therefore no knowledge about the direction of arrival for the best TX beam and therefore has to evaluate all its narrow RX beams during the RX beam sweep.

The embodiments disclosed herein relate to mechanisms for improved beam training. In order to obtain such mechanisms there is provided a radio transceiver device 200a, a method performed by the radio transceiver device 200a, a computer program product comprising code, for example in the form of a computer program, that when run on a radio transceiver device 200a, causes the radio transceiver device 200a to perform the method.

Figure 3:
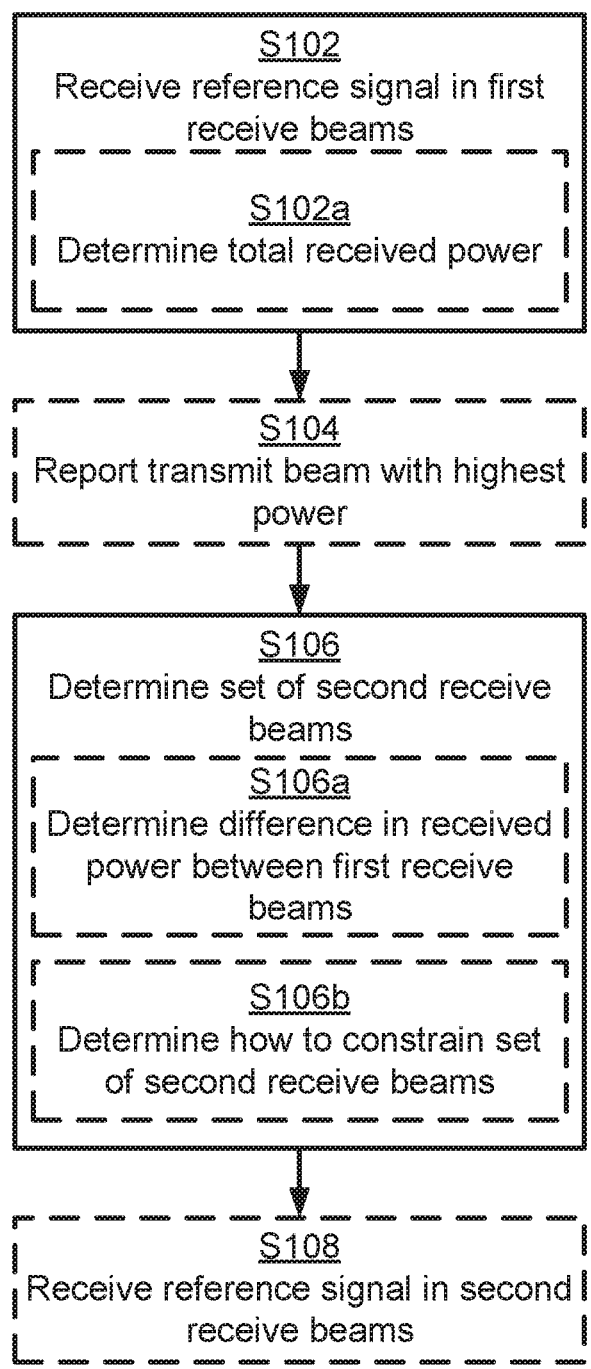
FIG. 3 is a flowchart of methods according to embodiments.

FIG. 3 is a flowchart illustrating embodiments of methods for beam training. The methods are performed by the radio transceiver device 200a. The methods are advantageously provided as computer programs 720.

The embodiments disclosed herein are based on using the polarization domain to obtain information about rough direction of arrival for the best TX beam during the TX beam sweep. Particularly, radio transceiver device 200a is configured to perform step S102:

S102: Radio transceiver device 200a receives, during a transmission beam sweep and using first receive beams 150a, 150b, a reference signal. The first receive beams 150a, 150b are of mutually different polarizations. The reference signal has been transmitted by radio transceiver device 200b during the transmission beam sweep in a set of transmit beams 140. The reference signal is received in order for radio transceiver device 200a to determine which transmit beam (say, transmit beam 140a) in the set of transmit beams 140 that has highest received power.

The information obtained in step S102 might then be used to improve the reception beam sweep, for example by the radio transceiver device 200a only sweeping in an angular sector around the estimated direction of arrival. Particularly, radio transceiver device 200a is configured to perform step S106:

S106: Radio transceiver device 200a determines, based on which transmit beam (say, transmit beam 140a) in the set of transmit beams 140 that has highest received power, a set of second receive beams 160a, 160b. The set of second receive beams 160a, 160b is to be used by radio transceiver device 200a during a reception beam sweep.

Embodiments relating to further details of beam training as performed by the radio transceiver device 200a will now be disclosed.

There may be different ways to select the first receive beams 1500a, 150b.

In some aspects the first receive beams 1500a, 150b are selected to have mutually orthogonal polarizations. Particularly, according to an embodiment, the mutually different polarizations are orthogonal with respect to each other.

It can be assumed that radio transceiver device 200a receives signals within a coverage sector. In some aspects, the first receive beams 150a, 150b need not to cover two different halves of this coverage sector but could have other shapes, as long as they cover different angular sub-sectors and together give the desired coverage of the entire coverage sector.

There could be different number of first receive beams 1500a, 150b. As disclosed above, some aspects the mutually polarizations are orthogonal to each other. This might limit the number of receive beams 150a, 150b to two. Therefore, according to an embodiment, there are two first receive beams 150a, 150b in which the reference signal is received.

There could be different ways for radio transceiver device 200a to generate the first receive beams 150a, 150b. As an example, each of the first receive beams 150a, 150b might be generated at a respective antenna array (of TRP 400a). The antenna arrays have mutually differently polarized antenna elements and are operatively connected to one baseband port each (i.e., one baseband port per polarization) via an analog distribution network. Radio transceiver device 200a might thus simultaneously use both (all) first receive beams 150a, 150b when receiving the reference signal during the transmission beam sweep.

In general terms, radio transceiver device 200b transmits one and the same reference signal in each transmit beam in the set of transmit beams 140. Particularly, according to an embodiment, one first instance of the reference signal is transmitted in each transmit beam in the set of transmit beams 140. Each first instance of the reference signal is then assumed to be received in all first receive beams 150a, 150b. That is, if there are two first receive beams 150a, 150b, the first instance of the reference signal as transmitted in each transmit beam is assumed to be received in both the first receive beams 1500a, 150b. Particularly, according to an embodiment, radio transceiver device 200a is configured to perform (optional) step S102a:

S102a: Radio transceiver device 200a determines, during the transmission beam sweep, total received power for each of the first instances (of the reference signal) by pair-wise combining received power of each of the first instances as received in each of the two first receive beams 1500a, 150b. Radio transceiver device 200a thereby identifies the transmit beam (say, beam 140a) in the set of transmit beams 140 that has highest received power.

In some aspects, step S102a is performed as part of step S102.

There could be different ways for radio transceiver device 200a to perform the combining in step S102a. Particularly, according to an embodiment, the combining comprises summation or maximum ratio combining of the received power of each of the first instances as received in the two first receive beams 150a, 150b.

Radio transceiver device 200a might report the thus identified best transmit beam to radio transceiver device 200b. Particularly, according to this embodiment, radio transceiver device 200a is configured to perform (optional) step S104:

S104: Radio transceiver device 200a reports, to radio transceiver device 200b, the transmit beam (say, beam 140a) having highest received power.

In this respect, radio transceiver device 200a might report the Nbest transmit beams, where N≥1 is an integer that might be configured by the network. In some aspects, each instance of the reference signal is transmitted together with an identifier of the beam in which the instance is transmitted. The reporting might therefore encompass radio transceiver device 200a to provide the identifier of the transmit beam having highest received power (possibly the identifiers of the Nbest transmit beams) in the report to radio transceiver device 200b.

The thus identified and reported best transmit beam might then be used by radio transceiver device 200b to transmit a reference signal during the reception beam sweep. Radio transceiver device 200a uses at least two second receive beams 160a, 160b for sequentially receiving the reference signal during the reception beam sweep.

There could be different ways for radio transceiver device 200a to determine which at least two second receive beams 160a, 160b to use. Aspects relating thereto will now be disclosed.

According to an embodiment, the set of second receive beams 160a, 160b is determined based on in which of the first receive beams 1500a, 150b the transmit beam with highest received power was received. In some aspects, received power is therefore measured in each of the first receive beams 150a, 150b. A difference between the measurements of received power might then be determined. Particularly, according to an embodiment, radio transceiver device 200a is configured to perform (optional) step S106a:

S106a: Radio transceiver device 200a determines a difference between the received power in the first receive beams 150a, 150b of mutually different polarizations.

In some aspects, step S106a is performed as part of step S106.

In some aspects, the difference between the received power in the respective first receive beams 150a, 150b is compared to a threshold power value in order for radio transceiver device 200a to determine which at least two second receive beams 160a, 160b to use. Particularly, according to an embodiment, radio transceiver device 200a is configured to perform (optional) step S106b:

S106b: Radio transceiver device 200a determines how to, in terms of sub-sector coverage, constrain the second receive beams 160a, 160b based on whether the difference exceeds the threshold power value or not.

In some aspects, step S106b is performed as part of step S106.

Aspects of the reception beam sweep will now be disclosed.

Figure 1:
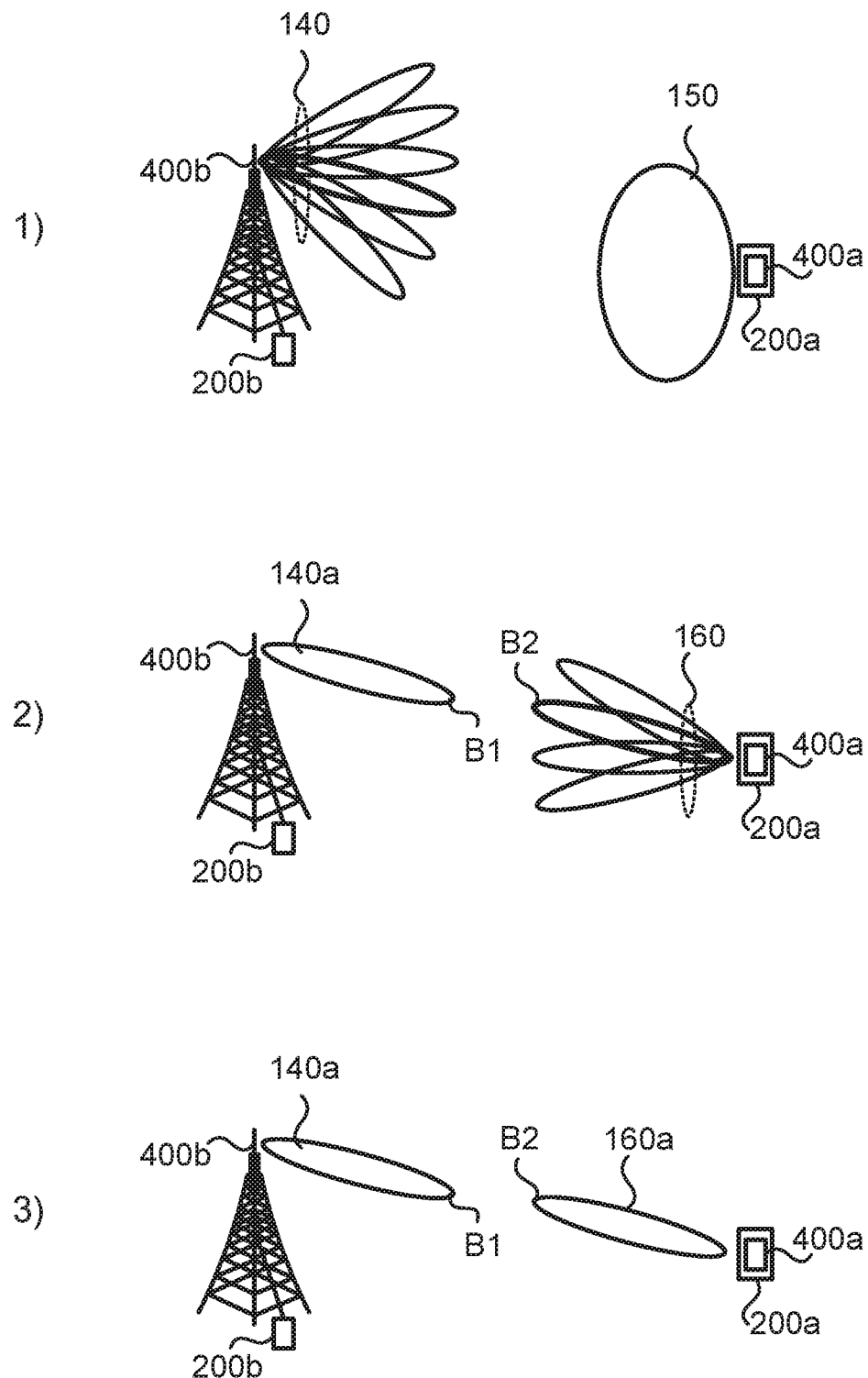
FIG. 1 schematically illustrates beam training.

In some aspects the reception beam sweep as disclosed hereafter is only performed if the difference in received power in the receive beams 1500a, 150b exceeds the threshold power value. Otherwise, a conventional reception beam sweep, such as illustrated at 2) in FIG. 1 might be performed.

Particularly, according to an embodiment, when the difference in received power in the receive beams 1500a, 150b exceeds the threshold power value, the at least two second receive beams 160a, 160b are constrained by having pointing directions and beam shapes so as to cover a sub-sector defined by the first receive beam having highest received power.

In other words, the sub-sector is defined by a radiation pattern where the radiation patter gain is larger for the first receive beam having highest received power for the best transmission beam than for the other first receive beam. That is, if the first receive beam 150a has highest received power for the best transmission beam, then sub-sector is defined by the radiation pattern where the first receive beam 150a has larger radiation patter gain than the first receive beam 150b.

In some aspects the reception beam sweep as disclosed hereafter is still performed even if the difference in received power in the receive beams 150a, 150b does not exceed the threshold power value. Particularly, if the received power differs less than the threshold power value it might be deduced that the direction of arrival is in the middle (or intersection) between the first receive beams 150a, 150b and the reception beam sweep therefore should be performed in a sub-sector around the middle (or intersection) of the first receive beams 150a, 150b. Particularly, according to an embodiment, when the difference does not exceed the threshold power value, the at least two second receive beams 160a, 160b are constrained by having pointing directions and beam shapes so as to cover a sub-sector defined at least by an intersection of all the first receive beams 150a, 150b.

Further aspects of the reception beam sweep will now be disclosed.

As disclosed above, radio transceiver device 200b transmits a reference signal during the reception beam sweep. This reference signal is assumed to be (sequentially) received in each of the at least two second receive beams 160a, 160b. Particularly, according to an embodiment, radio transceiver device 200a is configured to perform (optional) step S108:

S108: Radio transceiver device 200a receives, from radio transceiver device 200b and during the reception beam sweep, at least two second instances of the reference signal. The reference signal is received by radio transceiver device 200a using at least two second receive beams 160a, 160b. The second receive beams 160a, 160b have at least one of pointing direction and beam shape based on a relation between the received power as received in the two first receive beams 150a, 150b for the first instance of the reference signal having highest received power.

In this respect, one respective second instance of the reference signal is received in each respective second receive beam 160a, 160b by radio transceiver device 200a switching from one second receive beam to another second receive beam between the second instances of the reference signal, radio transceiver device 200*a* thus performing a beam sweep between the second receive beams 160*a*, 160*b*.

The second instances of the reference signal are typically transmitted from radio transceiver device 200*b* using the transmission beam 140*a* having highest total received power (i.e., the transmission beam 140*a* as identified during the transmission beam sweep).

There could be different ways for radio transceiver device 200*a* to determine the at least two second receive beams 160*a*, 160*b* (i.e., which at least two second receive beams 160*a*, 160*b* to use). Aspects relating thereto will now be disclosed.

The second receive beams 160*a*, 160*b* are typically more narrow than the first receive beams 150*a*, 150*b*. Particularly, according to an embodiment, each of the first receive beams 1500*a*, 150*b* has a wider main lobe than each of the second receive beams 160*a*, 160*b*.

Each of the second receive beams 160*a*, 160*b* might have two orthogonal polarizations in order to reduce potential polarization mismatch. Particularly, according to an embodiment, each of the second receive beams 160*a*, 160*b* is of two polarizations.

It is noted that some of the herein disclosed embodiments are not dependent on a reception beam sweep being performed. That is, some of the herein disclosed embodiments are equally applicable in scenarios where a reception beam sweep is not triggered, e.g. in order to save overhead or reduce latency. Radio transceiver device 200*a* might in such scenarios use the direction information obtained from performing step S102 (and, optionally, step S102*a*) in order to select a second reception beam without having to perform a beam sweep. Since the directional information obtained from obtained from performing step S102 (and, optionally, step S102*a*) is coarse, it might then be preferred that the second reception beam is relatively wide beam, e.g. having the same beam width as one of the first reception beams.

There could be different types of reference signals. Which reference signal to transmit (and hence for radio transceiver device 200*a* to receive) might depend on which type of radio transceiver device 200*b* is transmitting the reference signal.

According to an embodiment the reference signal is a CSI-RS, or is defined by a synchronization signal (SS) block. This could be a typical case where radio transceiver device 200*b* is a network node and radio transceiver device 200*a* is a terminal device.

According to an embodiment the reference signal is a sounding reference signal (SRS). This could be a typical case where radio transceiver device 200*b* is a terminal device and radio transceiver device 200*a* is a network node.

There could be different ways to generate beams of different widths. For example, by applying principles disclosed in document WO2011/050866A1 it is, for example, possible to generate as wide beam widths (for the reception beams 150, 150*a*, 150*b*, 160*a*, 160*b*) as the antenna element beam width, regardless of how many antenna elements there are in the antenna array, thus resulting in dual-polarization beamforming. Dual-polarization beamforming can thus be used to selectively widening or narrowing reception beams 150, 150*a*, 150*b*, 160*a*, 160*b* as needed. Hence, principles disclosed in document WO2011/050866A1 can be applied to the TRP 400*a* in order to generate the reception beams 150, 150*a*, 150*b*, 160*a*, 160*b*. Other examples of principles that could be used to generate reception beams 150, 150*a*, 150*b*, 160*a*, 160*b* with beam widths as needed are based on optimizing complex weights of the antenna array or by muting some antenna elements of the antenna array. A way to generate wide (as well as narrow) reception beams 150, 150*a*, 150*b*, 160*a*, 160*b* with phase shifts only is by means of the array expansion technique described in WO2016141961 A1. WO2016141961 A1 relates to beam forming using an antenna array comprising dual polarized elements.

Figure 4:
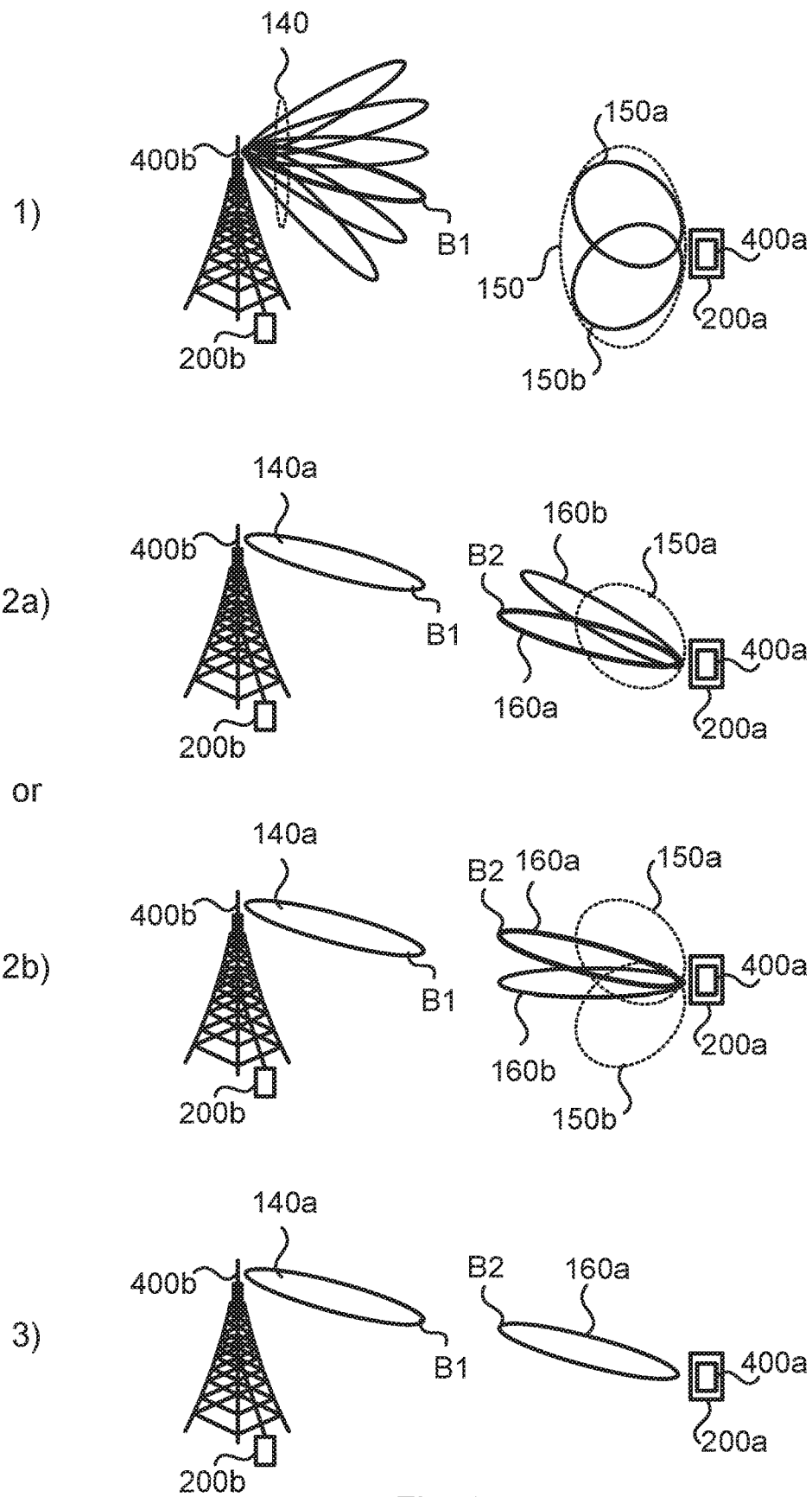
FIG. 4 schematically illustrates beam training according to embodiments.

Reference is now made to FIG. 4 which, at 1), 2*a*), 2*b*), and 3), schematically illustrates beam training based on at least some of the above disclosed embodiments. In the illustrative example of FIG. 4, radio transceiver device 200*b* is implemented as a network node radio transceiver device 200*a* is implemented as a terminal device.

At 1), during a TX beam sweep of radio transceiver device 200*b* in TX beams 140, radio transceiver device 200*a* uses two different RX beams 150*a*, 150*b* with mutually different polarizations, P1 and P2. During the TX beam sweep, radio transceiver device 200*a* needs to have a wide beam coverage so that it can receive all TX beams 140. This wide beam coverage is schematically illustrated by the wide beam 150. For polarization P1, radio transceiver device 200*a* uses RX beam 150*a* that covers the upper half of the wide beam 150 and for polarization P2, radio transceiver device 200*a* uses RX beam 150*b* that covers the lower half of the wide beam 150. When P1 and P2 are orthogonal in all directions, the total receive power pattern is given by the wide beam 150. Further, during the TX beam sweep, for each TX beam 140 radio transceiver device 200*a* evaluates received power in each RX beam 1500*a*, 150*b* as well as the total power over both RX beams 1500*a*, 150*b* (e.g. by summation or maximum ratio combining). Radio transceiver device 200*a* selects the best TX beam (TX beam B1 in the example of FIG. 4) based on the total received power. The best beam B1 is reported to radio transceiver device 200*b*. Radio transceiver device 200*a* then compares the received power in each RX beam 150*a*, 150*b* for the selected TX beam B1.

An RX beam sweep is then performed either at 2*a*) or at 2*b*). In either case, radio transceiver device 200*b* transmits its reference signal in one beam 140*a*, being selected as best TX beam B1 during the TX beam sweep.

At 2*a*), when the received power in RX beam 150*a* is higher than the received power in RX beam 150*b*, radio transceiver device 200*a* determines to perform its RX beam sweep only in the upper half of the wide beam 150*o*, and vice versa. In the illustrative example of FIG. 4 at 2*a*), it is assumed that RX beam 150*a* had the highest received power for the selected TX beam B1. RX beams 160*a*, 160*b* as collectively covering RX beam 150*a* are thus evaluated in the RX beam sweep.

Alternatively, at 2*b*), when the received power in RX beam 150*a* and RX beam 150*b* does not differ substantially, for example when the difference does not exceed the threshold power value, radio transceiver device 200*a* determines to perform its RX beam sweep in the middle portion of the wide beam 150. In the illustrative example of FIG. 4 at 2*b*) RX beams 160*a*, 160*b* as collectively partly covering RX beams 150*a*, 150*b* are evaluated in the RX beam sweep.

During the RX beam sweep (either at 2*a*) or at 2*b*)), radio transceiver device 200*a* find its best RX beam (as defined by RX beam B2 in the illustrative example).

At 3), a BPL for data transmission can be established using the selected TX beam B1 and the selected RX beam B2.

In summary, according to at least some of the herein disclosed embodiments, a radio transceiver device 200*a* equipped with a dual-polarized antenna array generates its RX beams such that during reception of a TX beam sweep, two reception beams with mutually different polarizations cover different angular sub-sectors and the sum of the two reception beams give the desired wide-beam coverage of the angular sector. Radio transceiver device 200a might report the best TX beam based on combining the power of the reference signal as received in the two reception beams. Radio transceiver device 200a might store the received power in the individual reception for each TX beam. When the best TX beam has been found, radio transceiver device 200a might determine the best angular sub-sector by comparing the received power in the two reception beams for the best TX beam. During a subsequent RX beam sweep, narrow RX beams might be evaluated only within the determined angular sub-sector.

Figure 5:
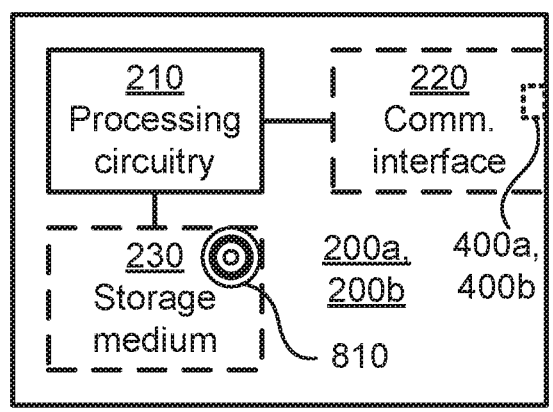
FIG. 5 is a schematic diagram showing functional units of a radio transceiver device according to an embodiment.

FIG. 5 schematically illustrates, in terms of a number of functional units, the components of radio transceiver device 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause radio transceiver device 200a, 200b to perform a set of operations, or steps, S102-S108, as disclosed above. For example, the storage medium 230 may store the set of operations, and the processing circuitry 210 may be configured to retrieve the set of operations from the storage medium 230 to cause radio transceiver device 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Radio transceiver device 200a, 200b may further comprise a communications interface 220 at least configured for communications with communications with another radio transceiver device 200b, 200a. As such the communications interface 220 may comprise one or more transmitters and receivers, comprising analogue and digital components. Signals, such as reference signals as well as data signals, could be transmitted from, and received by, a TRP 400a, 400b of radio transceiver device 200a, 200b. The TRP 400a, 400b could form an integral part of radio transceiver device 200a, 200b or be physically separated from radio transceiver device 200a, 200b. The communications interface 220 might thus optionally comprise the TRP 400a, 400b.

The processing circuitry 210 controls the general operation of radio transceiver device 200a, 200b e.g. by sending data and control signals to the communications interface 220 and the storage medium 230, by receiving data and reports from the communications interface 220, and by retrieving data and instructions from the storage medium 230. Other components, as well as the related functionality, of radio transceiver device 200a, 200b are omitted in order not to obscure the concepts presented herein.

Figure 6:
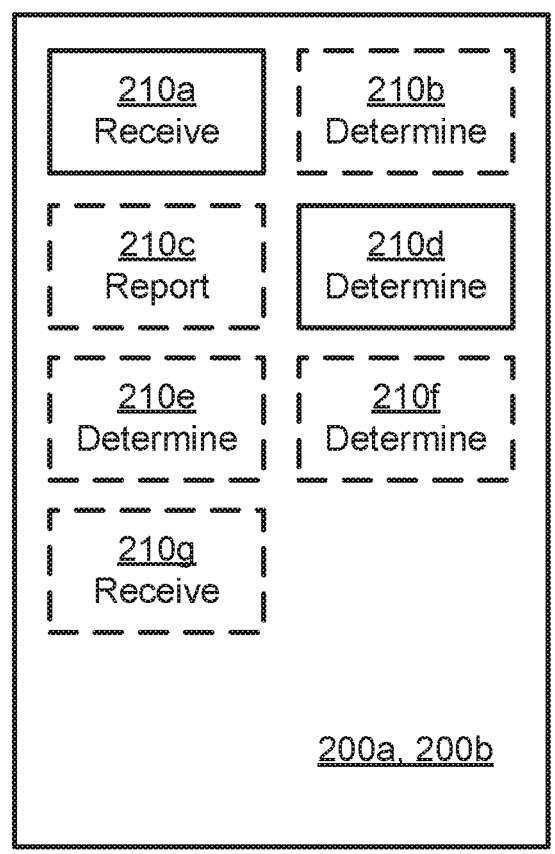
FIG. 6 is a schematic diagram showing functional modules of a radio transceiver device according to an embodiment.

FIG. 6 schematically illustrates, in terms of a number of functional modules, the components of radio transceiver device 200a, 200b according to an embodiment. Radio transceiver device 200a, 200b of FIG. 6 comprises a number of functional modules; a receive module 210a configured to perform step S102, and a determine module 210d configured to perform step S106. Radio transceiver device 200a, 200b of FIG. 6 may further comprise a number of optional functional modules, such as any of a determine module 210b configured to perform step S102a, a report module 210c configured to perform step S104, a determine module 210e configured to perform step S106a, a determine module 210f configured to perform step S106b, and a receive module 210g configured to perform step S1008.

In general terms, each functional module 210a-210g may in one embodiment be implemented only in hardware and in another embodiment with the help of software, i.e., the latter embodiment having computer program instructions stored on the storage medium 230 which when run on the processing circuitry makes radio transceiver device 200a, 200b perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module 210a-210g and to execute these instructions, thereby performing any steps as disclosed herein.

Radio transceiver device 200a, 200b may be provided as a standalone device or as a part of at least one further device. Examples of devices in which the functionality of radio transceiver device 200a, 200b might be provided have been given above with reference to FIG. 2.

A first portion of the instructions performed by radio transceiver device 200a, 200b may be executed in a first device, and a second portion of the of the instructions performed by radio transceiver device 200a, 200b may be executed in a second device; the herein disclosed embodiments are not limited to any particular number of devices on which the instructions performed by radio transceiver device 200a, 200b may be executed. Hence, the methods according to the herein disclosed embodiments are suitable to be performed by a radio transceiver device 200a, 200b residing in a cloud computational environment. Therefore, although a single processing circuitry 210 is illustrated in FIG. 5 the processing circuitry 210 may be distributed among a plurality of devices, or nodes. The same applies to the functional modules 210a-210g of FIG. 6 and the computer program 720 of FIG. 7 (see below).

Figure 7:
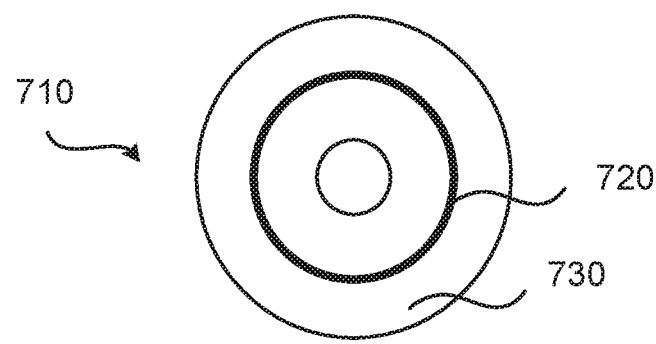
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for beam training, the method being performed by a radio transceiver device, the method comprising:
   receiving, during a transmission beam sweep and using first receive beams of mutually different polarizations, a reference signal having been transmitted by another radio transceiver device during the transmission beam sweep in a set of transmit beams in order to determine which transmit beam in the set of transmit beams that has highest received power;
   determining a difference between the received power in the first receive beams of mutually different polarizations;
   determining, based on which transmit beam in the set of transmit beams that has highest received power, a set of second receive beams to be used by the radio transceiver device during a reception beam sweep; and
   determining how to, in terms of sub-sector coverage, constrain the set of second receive beams based on whether or not the difference exceeds a threshold power value.

2. The method according to claim 1, wherein the set of second receive beams is determined based on in which of the first receive beams the transmit beam with highest received power was received.

3. The method according to claim 1, wherein the mutually different polarizations are orthogonal to each other.

4. The method according to claim 1, wherein one first instance of the reference signal is transmitted in each transmit beam in the set of transmit beams, and wherein each first instance of the reference signal is received in all first receive beams.

5. The method according to claim 1, wherein there are two first receive beams in which the reference signal is received.

6. The method according to claim 5, wherein each of the two first receive beams are generated at a respective antenna array, wherein the antenna arrays have mutually differently polarized antenna elements and are both operatively connected to one baseband port each via an analog distribution network.

7. The method according to claim 5, further comprising:
   determining, during the transmission beam sweep, total received power for each of the first instances by pair-wise combining received power of each of the first instances as received in each of the two first receive beams, thereby identifying the transmit beam in the set of transmit beams that has highest received power; and
   reporting, to said another radio transceiver device, the transmit beam having highest received power.

8. The method according to claim 1, wherein the set of second receive beams comprises at least two second receive beams and wherein, when the difference between the received power in the first receive beams of mutually different polarizations exceeds the threshold power value, the at least two second receive beams are constrained by having pointing directions and beam shapes so as to cover a sub-sector defined by the first receive beam having highest received power.

9. The method according to claim 1, wherein the set of second receive beams comprises at least two second receive beams and wherein, when the difference between the received power in the first receive beams of mutually different polarizations does not exceed the threshold power value, the at least two second receive beams are constrained by having pointing directions and beam shapes so as to cover a sub-sector defined at least by an intersection of all the first receive beams.

10. A method for beam training, the method being performed by a radio transceiver device, the method comprising:
    receiving, during a transmission beam sweep and using first receive beams of mutually different polarizations, a reference signal having been transmitted by another radio transceiver device during the transmission beam sweep in a set of transmit beams in order to determine which transmit beam in the set of transmit beams that has highest received power;
    determining, during the transmission beam sweep, total received power for each of the first instances by pair-wise combining received power of each of the first instances as received in each of two first receive beams in which the reference signal is received, thereby identifying the transmit beam in the set of transmit beams that has highest received power, wherein the pair-wise combining comprises summation or maximum ratio combining of the received power of each of the first instances as received in the two first receive beams;
    reporting, to said another radio transceiver device, the transmit beam having highest received power; and
    determining, based on which transmit beam in the set of transmit beams that has highest received power, a set of second receive beams to be used by the radio transceiver device during a reception beam sweep.

11. A method for beam training, the method being performed by a radio transceiver device, the method comprising:
    receiving, during a transmission beam sweep and using first receive beams of mutually different polarizations, a reference signal having been transmitted by another radio transceiver device during the transmission beam sweep in a set of transmit beams in order to determine which transmit beam in the set of transmit beams that has highest received power;
    determining, during the transmission beam sweep, total received power for each of the first instances by pair-wise combining received power of each of the first instances as received in each of two first receive beams in which the reference signal is received, thereby identifying the transmit beam in the set of transmit beams that has highest received power;
    reporting, to said another radio transceiver device, the transmit beam having highest received power;
    determining, based on which transmit beam in the set of transmit beams that has highest received power, a set of second receive beams to be used by the radio transceiver device during a reception beam sweep; and
    receiving, from said another radio transceiver device and during the reception beam sweep, at least two second instances of the reference signal using at least two second receive beams, wherein the second receive beams have at least one of pointing direction and beam shape based on a relation between the received power as received in the two first receive beams for the first instance of the reference signal having highest received power.

12. The method according to claim 11, wherein the second instances of the reference signal are transmitted from said another radio transceiver device using the transmission beam having highest total received power.

13. The method according to claim 11, wherein each of the first receive beams has a wider main lobe than each of the second receive beams.

14. The method according to claim 11, wherein each of the second receive beams is of two polarizations.

15. A radio transceiver device for beam training, the radio transceiver device comprising processing circuitry, the processing circuitry being configured to cause the radio transceiver device to:
receive, during a transmission beam sweep and using first receive beams of mutually different polarizations, a reference signal having been transmitted by another radio transceiver device during the transmission beam sweep in a set of transmit beams in order to determine which transmit beam in the set of transmit beams that has highest received power;
determine a difference between the received power in the first receive beams of mutually different polarizations;
determine, based on which transmit beam in the set of transmit beams that has highest received power, a set of second receive beams to be used by the radio transceiver device during a reception beam sweep; and
determine how to, in terms of sub-sector coverage, constrain the set of second receive beams based on whether or not the difference exceeds a threshold power value.

16. The radio transceiver device according to claim 15, wherein the set of second receive beams comprises at least two second receive beams and wherein the processing circuitry being further configured to cause the radio transceiver device to, when the difference between the received power in the first receive beams of mutually different polarizations exceeds the threshold power value, constrain the at least two second receive beams by having pointing directions and beam shapes so as to cover a sub-sector defined by the first receive beam having highest received power.

17. The radio transceiver device according to claim 15, wherein the set of second receive beams comprises at least two second receive beams and wherein the processing circuitry being further configured to cause the radio transceiver device to, when the difference between the received power in the first receive beams of mutually different polarizations does not exceed the threshold power value, constrain the at least two second receive beams by having pointing directions and beam shapes so as to cover a sub-sector defined at least by an intersection of all the first receive beams.

* * * * *

UNITED STATES PATENT AND TRADEMARK OFFICE
CERTIFICATE OF CORRECTION

PATENT NO. : 10,680,688 B2  
APPLICATION NO. : 15/752473  
DATED : June 9, 2020  
INVENTOR(S) : Nilsson et al.

Page 1 of 2

It is certified that error appears in the above-identified patent and that said Letters Patent is hereby corrected as shown below:

In the Drawings

In Fig. 5, Sheet 5 of 5, delete Tag "810" and insert Tag -- 710 --, therefor.

In the Specification

In Column 1, Line 60, delete "N best" and insert -- Nbest --, therefor.

In Column 1, Line 64, delete "back N" and insert -- backN --, therefor.

In Column 4, Line 59, delete "fifth (5G)" and insert -- fifth generation (5G) --, therefor.

In Column 6, Line 28, delete "1500a," and insert -- 150a, --, therefor.

In Column 6, Line 29, delete "1500a," and insert -- 150a, --, therefor.

In Column 6, Line 41, delete "1500a," and insert -- 150a, --, therefor.

In Column 6, Line 67, delete "1500a," and insert -- 150a, --, therefor.

In Column 7, Line 7, delete "1500a," and insert -- 150a, --, therefor.

In Column 7, Line 49, delete "1500a," and insert -- 150a, --, therefor.

In Column 8, Line 11, delete "1500a," and insert -- 150a, --, therefor.

In Column 8, Line 15, delete "1500a," and insert -- 150a, --, therefor.

In Column 9, Line 16, delete "1500a," and insert -- 150a, --, therefor.

Signed and Sealed this  
Nineteenth Day of January, 2021

Andrei Iancu  
*Director of the United States Patent and Trademark Office*

CERTIFICATE OF CORRECTION (continued)
U.S. Pat. No. 10,680,688 B2

In Column 10, Line 27, delete "1500a," and insert -- 150a, --, therefor.

In Column 10, Line 28, delete "1500a," and insert -- 150a, --, therefor.

In Column 10, Line 42, delete "150o," and insert -- 150a, --, therefor.